US009824605B2

(12) United States Patent
Comtois (10) Patent No.: US 9,824,605 B2
(45) Date of Patent: Nov. 21, 2017

(54) CENTRIFUGE-BASED-FLIGHT SIMULATOR

(75) Inventor: Paul Comtois, Warrington, PA (US)

(73) Assignee: ENVIRONMENTAL TECTONICS CORP., Southamton, PA (US)

( * ) Notice: Subject to any disclaimer, the term of this patent is extended or adjusted under 35 U.S.C. 154(b) by 668 days.

(21) Appl. No.: 13/352,659

(22) Filed: Jan. 18, 2012

(65) Prior Publication Data
US 2013/0183640 A1      Jul. 18, 2013

(51) Int. Cl.
G09B 9/28            (2006.01)

(52) U.S. Cl.
CPC ..................... G09B 9/28 (2013.01)

(58) Field of Classification Search
CPC ... G09B 9/12; G09B 9/28; G09B 9/30; G09B 9/301; G09B 9/302; G09B 9/304; G09B 9/305; A63G 5/00; A63G 1/00
USPC .......................................... 434/55, 59; 703/8
See application file for complete search history.

(56) References Cited

U.S. PATENT DOCUMENTS

| | | | | |
|---|---|---|---|---|
| 3,732,630 | A | * | 5/1973 | Crosbie ..................... G09B 9/12 33/330 |
| 4,710,128 | A | | 12/1987 | Wachsmuth et al. |
| 4,751,662 | A | * | 6/1988 | Crosbie ............................. 703/8 |
| 5,021,982 | A | * | 6/1991 | Crosbie et al. .................... 703/8 |
| 5,051,094 | A | | 9/1991 | Richter et al. |
| 5,353,242 | A | * | 10/1994 | Crosbie ..................... G09B 9/12 434/55 |
| 6,902,402 | B2 | | 6/2005 | McClintic |
| 2002/0164560 | A1 | | 11/2002 | Borta |
| 2004/0197742 | A1 | | 10/2004 | Alsenz |
| 2010/0194746 | A1 | * | 8/2010 | Barbina et al. ................. 345/419 |
| 2011/0045446 | A1 | * | 2/2011 | Glaser ...................... G09B 9/12 434/59 |

OTHER PUBLICATIONS

Van Poppel, J. A.; Simulation of Thrust-Vectored Aircraft Maneuvers in a Human Centrifuge: Model Validation & Design for the Dynamic Environment Simulator; AFRL-HE-WP-TR-1998-0138.*
Van Poppel (Simulation of Thrust-Vectored Aircraft Maneuvers in a Human Centrifuge: Model Validation and Design for the Dynamic Environment Simulator / AFRL-HE-WP-TR-1998-0138).*
(Continued)

Primary Examiner — Timothy A Musselman
(74) Attorney, Agent, or Firm — Axenfeld Law Group, LLC; Robert R. Axenfeld (57) ABSTRACT

Some implementations include a method for operating a centrifuge-based-flight simulator in at least one of several different modes: a heightened G-force mode, a normal G-force mode; and transition modes (i.e., ramp-up or ramp-down modes) between the heightened G-force and normal G-force modes. During the normal-G-force mode the simulator ceases planetary motion altogether or substantially decreases rotations to replicate a plurality of flight conditions that physically imparts, on the trainee during operation of the simulator, a G-force that is not greater than approximately one (1) G. The reduction of planetary motion while maintaining realistic motion and force sensations that are appropriate for the virtual-flight conditions being experienced allows realistic flight simulation experience for the trainee and reduces the negative effects of constant planetary motion.

3 Claims, 6 Drawing Sheets

(56) References Cited

OTHER PUBLICATIONS

International Preliminary Report on Patentability (Written Opinion of the International Searching Authoring) of PCT Application No. PCT/US2012/021728, dated Dec. 26, 2012.
"How to cheat in motion simulation comparing the engineering and fun ride approach to motion cueing" Authors Markus von der Heyde et al., Max-Planck-Institute fur biologische Kybemetik, Tubingen, Germany, Dec. 2001.
"Design and Evaluation of Spherical Washout Algorithm for Desdemona Simulator" Authors Mark Wentink, et al., AIAA Modeling and Simulation Technologies Conference and Exhibit, Aug. 15-18, 2005, San Francisco, California, USA.
"Developing Scenarios for Research into Upset Recover Simulation" Authors Lars Fucke et al., AIAA Modeling and Simulation Technologies Conference, Aug. 2-5, 2010, Toronto, Ontario, Canada.
Supplemental European Search Report for PCT/US2012021728, dated Jul. 31, 2015.
"A study to Evaluate the Suitability of a Centrifuge as a Dynamic Flight Simulator for F/A-18 Strike Fighter Mission Training Recommended Citation Study to Evaluate the Suitability of a Centrifuge as a Dynamic Flight Simulator for F/A-18 Strike Fighter Mission Training", University of Tennessee, Trace: Tennessee Research and Creative Exchange, Dec. 31, 2009.
European Patent Office Communication pursuant to Article 94(3) EPC, dated Nov. 25, 2016.

\* cited by examiner

CENTRIFUGE-BASED-FLIGHT SIMULATOR

BACKGROUND

Flight simulators are used by the military and civil-aviation industry as a low-cost alternative to actual flight time that allows pilots to gain valuable flight experience.

Although there are numerous devices used in flight simulation, all these devices can be categorized as non-motion and motion trainers.

Within the category of motion trainers, the most commonly known device is referred to as a Stewart Platform, a six DoF platform ("DoF", pronounced as "doff" within the industry, means "degrees of freedom"), or hexapod platform. The six degrees of freedom are pitch, roll, yaw, heave, sway, and surge. This type of platform is a motion cueing device in that it gives the pilot the initial effect of a climb or dive, but due to limitations cannot replicate the complete flight envelope.

The other type of motion trainer is a Continuous G Device (CGD) which generally has the pitch, roll, and yaw degrees of freedom as well as planetary motion, hence the name Continuous G Device. A CGD is essentially a centrifuge-based simulator.

Over the years, a six DoF platform has become a standard, and is required for the so-called Level D flight simulator standard of civil aviation regulatory authorities such as the Federal Aviation Administration (FAA) in the United States and the European Aviation Safety Agency (EASA) in Europe. This type of platform-based-stationary trainer provides the trainee with an experience of being in an airplane cockpit with high-resolution, wide-field visual displays of flight scenes. These simulators also attempt to replicate motion cues through the use of a piston-driven-motion system located underneath the platform of the simulator. The pistons position the simulator's platform at different angles, which are usually limited in range of motion. For instance, such simulators cannot angle themselves beyond +/−45 degrees of pitch or +/−45 degrees of roll. They also do not have the capability to produce positive or negative G forces, to turn upside down, or to impart physiological stresses on the trainee.

A major drawback of such six DoF platform-based-stationary simulators, therefore, is that they cannot replicate a full 360 degree range of flight motion, nor impart Gravitational (G) forces on a pilot.

Unfortunately, most accidents resulting from a loss of airplane control in civil aviation—sometimes referred to as airplane "upsets"—involve airplane conditions outside the normal-flight envelope, such as pitch attitudes greater than 25 degrees nose up; pitch attitude greater than 10 degrees nose down; bank angles greater than 45 degrees; as well as increased G forces imparted on the flight crew. It is these airplane movements coupled with increased gravitational forces, which often causes disorienting vestibular and tactile stresses on a pilot during real-world-flight conditions.

Thus, even if a pilot learns the correct procedures for recovery from a loss-of-control situation such as an upset condition in an airplane, a pilot who is trained on only six DoF platform-based-stationary simulators may not be able to properly execute control of over an airplane in the real world, because he or she is not prepared to properly respond when confronted with the physiological stresses, external forces, and disorienting effects typically experienced by pilots during actual flight; especially flight conditions outside of the normal-flight envelope.

Centrifuge-based simulators, on the other hand, are generally able to provide trainees with all of the benefits of six DoF platform-based-stationary simulators, but are also able to replicate full-multi-axis movements (for pitch, roll or yaw) coupled with actual elevated G-forces through the use of planetary motion. Thus, centrifuge-based simulators are able to address deficiencies that platform-based-stationary simulators cannot replicate, such as placing elevated G-forces and physiological stresses on a pilot, while permitting the pilot to also experience unrestricted multi-axis movements associated with actual flight. This allows pilots to train to cope with physiological stresses during routine flight, and flight conditions outside of the normal-flight envelope.

SUMMARY

Although centrifuge-based simulators are superior to piston-driven-stationary simulators, in that they allow for the replication of realistic G-forces and full freedom of motion, conventional-centrifugal simulators remain in a constant state of planetary motion, perpetually rotating throughout the entirety of operation of the simulator.

The constant state of planetary motion in centrifuge-based simulators can create physiological challenges and artifacts in the trainees that a pilot would not experience in actual flight. These challenges can include motion discomfort, fatigue, disorientation, visual disturbances, and other negative motion illusions. In other words, the constant planetary motion of traditional centrifugal simulators can cause negative physiological effects to the trainees that are beyond the expected, realistic effects caused by actual flight.

Various embodiments described herein address the challenges that are caused by the constant planetary motion in traditional centrifuge-based simulators.

In one example, a controller used to control the simulator operates in at least one of several different modes: a heightened G-force mode, a normal G-force mode; and transition modes (i.e., ramp-up or ramp-down modes) between the heightened G-force and normal G-force modes.

When operating in the heightened G-force mode the controller instructs the simulator to replicate a plurality of first-flight conditions by rotating the simulator at a plurality of rates of rotation that physically imparts, on a trainee during operation of the simulator, a G-force that is greater than about one (1) G.

When operating in the normal-G-force mode the controller instructs the simulator to replicate a plurality of second-flight conditions by either ceasing the rotation of the simulator altogether or by rotating the simulator at a second, lesser rate of rotation that physically imparts, on the trainee during operation of the simulator, a G-force that is not greater than about one (1) G.

And, when operating in the transition mode of operation (i.e., ramp-up or ramp-down modes) a flight simulator transitions between the heightened-G-force mode of operation and normal-G-force mode of operation, and vice versa.

For example, suppose the flight condition of a virtual plane operated by a trainee in the simulator transitions from a take-off (i.e. a heightened G-force flight condition) to level flight (i.e. about one G). Then the controller may instruct the simulator to disengage activating planetary motion, and may permit the simulator to decelerate its rate of rotation toward about zero velocity. The simulator may reach a stationary position in which it is not rotating or is rotating so slowly that only normal G-forces are imparted on the trainee (i.e. about one (1) G of force).

In another example, suppose the flight condition of a virtual plane operated by a trainee in the simulator transitions from a level flight (i.e. about one G of force) to a landing (i.e. a heightened G-force flight condition). Then the controller may instruct the simulator to initiate planetary motion, and permit the simulator to accelerate its rate of rotation from a very low, or zero, velocity to some planetary velocity, which will permit the simulator to quickly impart heightened G-forces on the trainee.

In still another example, when in the transition mode, accelerating or decelerating the rotation of the flight simulator occurs at a rate which is generally below a perceptible threshold for human detection. So, a trainee operating a virtual plane within the simulator does not necessarily sense a change in the rate of planetary movement of the simulator—and does not necessarily sense whether there is planetary movement at all—and therefore does not experience heightened G-forces.

In yet another example, the controller also generates a virtual scene in a cockpit of a virtual plane representing an actual-predetermined aircraft replicated by the simulator. The controller monitors a position of the virtual plane relative to a predetermined virtual boundary and triggers the simulator to transition between the heightened and normal G-force modes, based at least in part, on the position of the virtual plane relative to the virtual boundary.

Thus, described herein are methods and systems for operating a centrifuge-based-flight simulator so as to minimize negative physiological effects of constant planetary motion on trainees while maintaining realistic simulation of actual flight conditions, movements, and forces encountered by such trainees.

This summary is provided to introduce a selection of concepts in a simplified form that are further described below. This summary is not necessarily intended to identify key features or essential features of the claimed subject matter, nor is it necessarily intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Example Centrifuge-Based Simulator

Figure 1A:
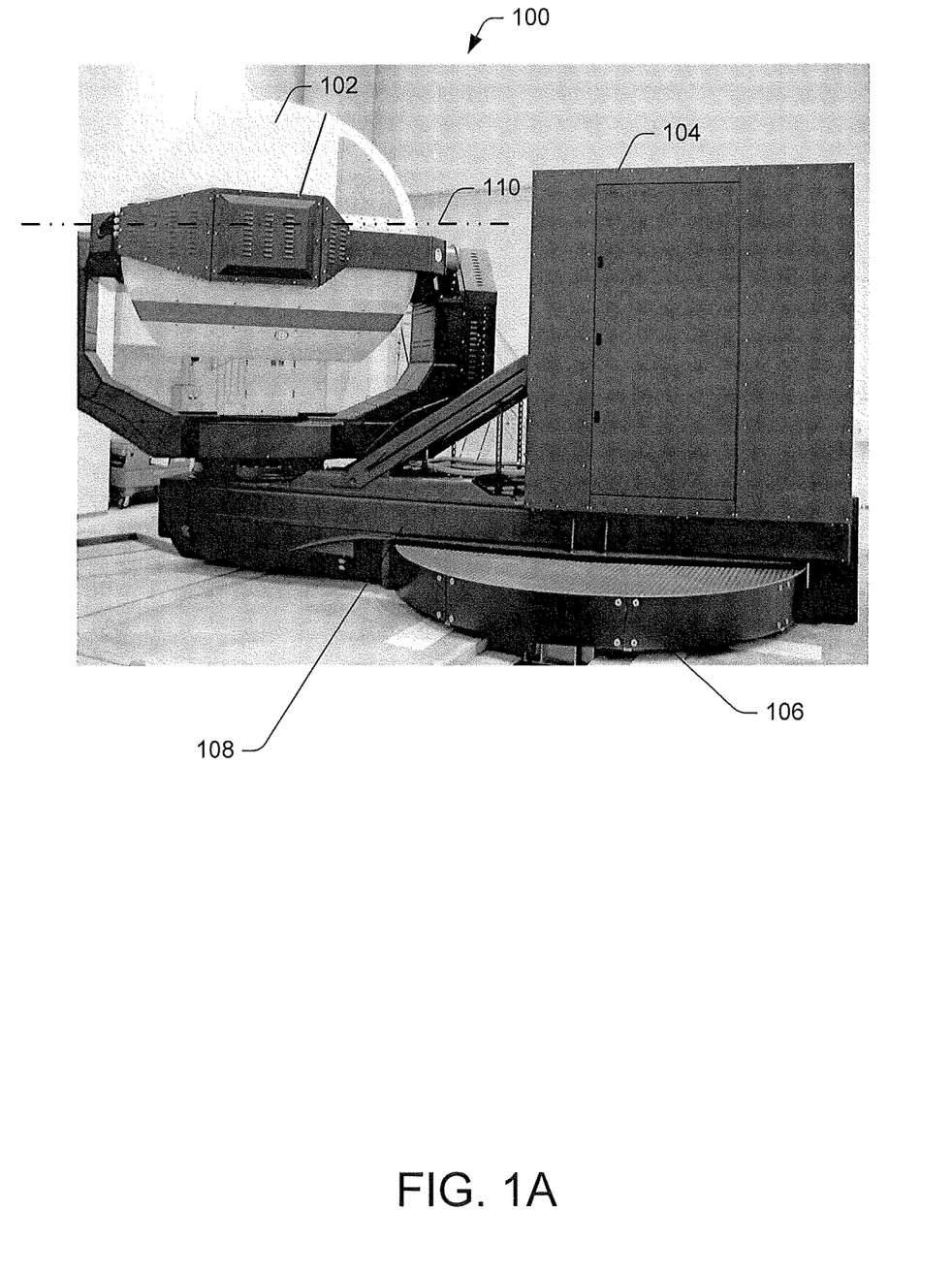
FIGS. 1A and 1B show example centrifuge-based simulators.
Figure 1B:
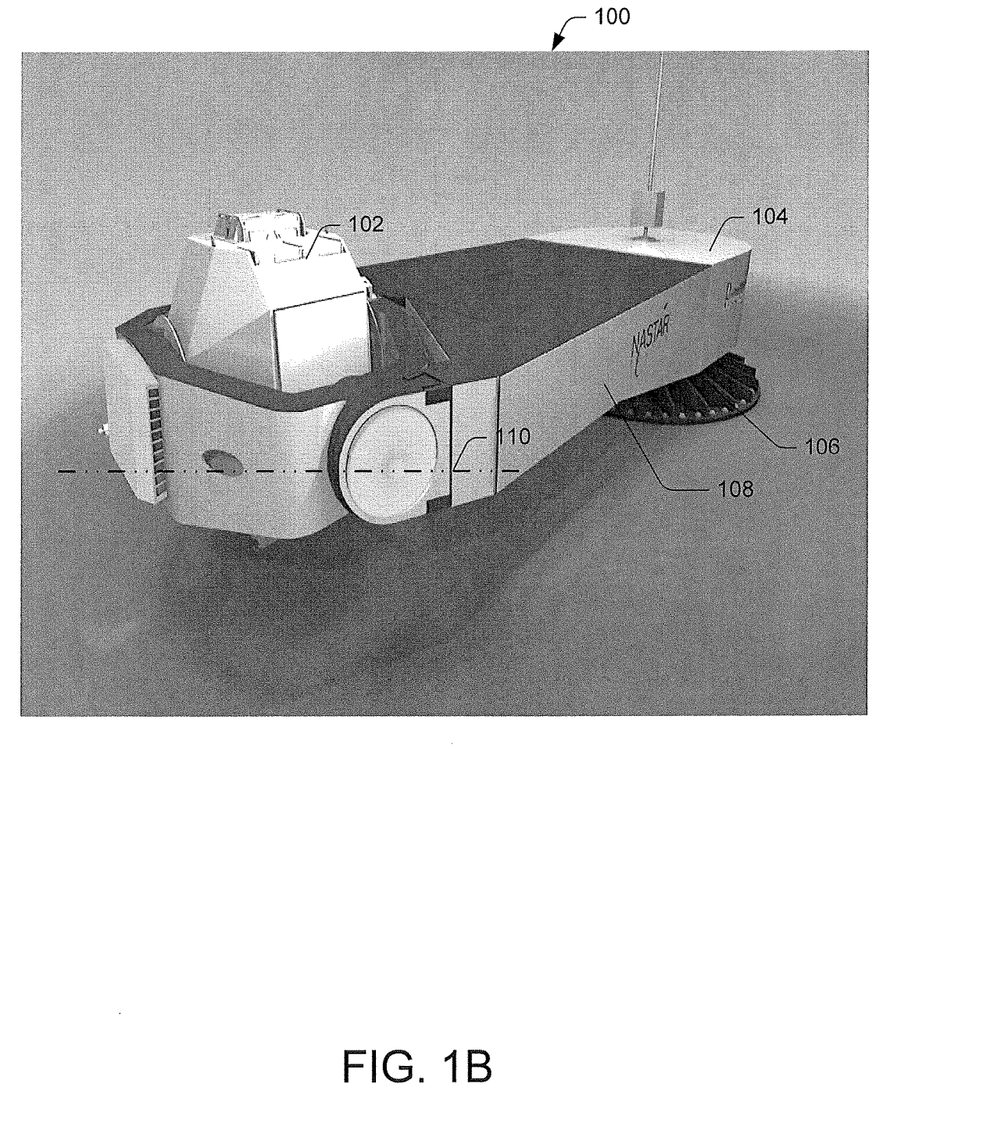

FIGS. 1A and 1B show example centrifuge-based simulators 100, which in the illustrative example includes a cockpit unit 102, a motion unit 104, and an arm 108. Referring to FIGS. 1A and 1B, cockpit unit 102 is a compartment connected to a centrifuge arm 108. Cockpit unit 102 is configured to spin around a central portion 106 of simulator 100 providing planetary motion, and impart enhanced gravity (G) forces on a pilot/trainee inside cockpit unit 102. Actual G-forces imparted on the trainee are dependent upon the length of arm 108, a distance cockpit unit 102 is from central portion 106, and a velocity cockpit unit 102 spins around central portion 106 (i.e., planetary velocity). Cockpit unit 102 is also configured to spin around an independent axis 110 to replicating ±360 degrees of movement in yaw, pitch and roll axes.

Figure 1C:
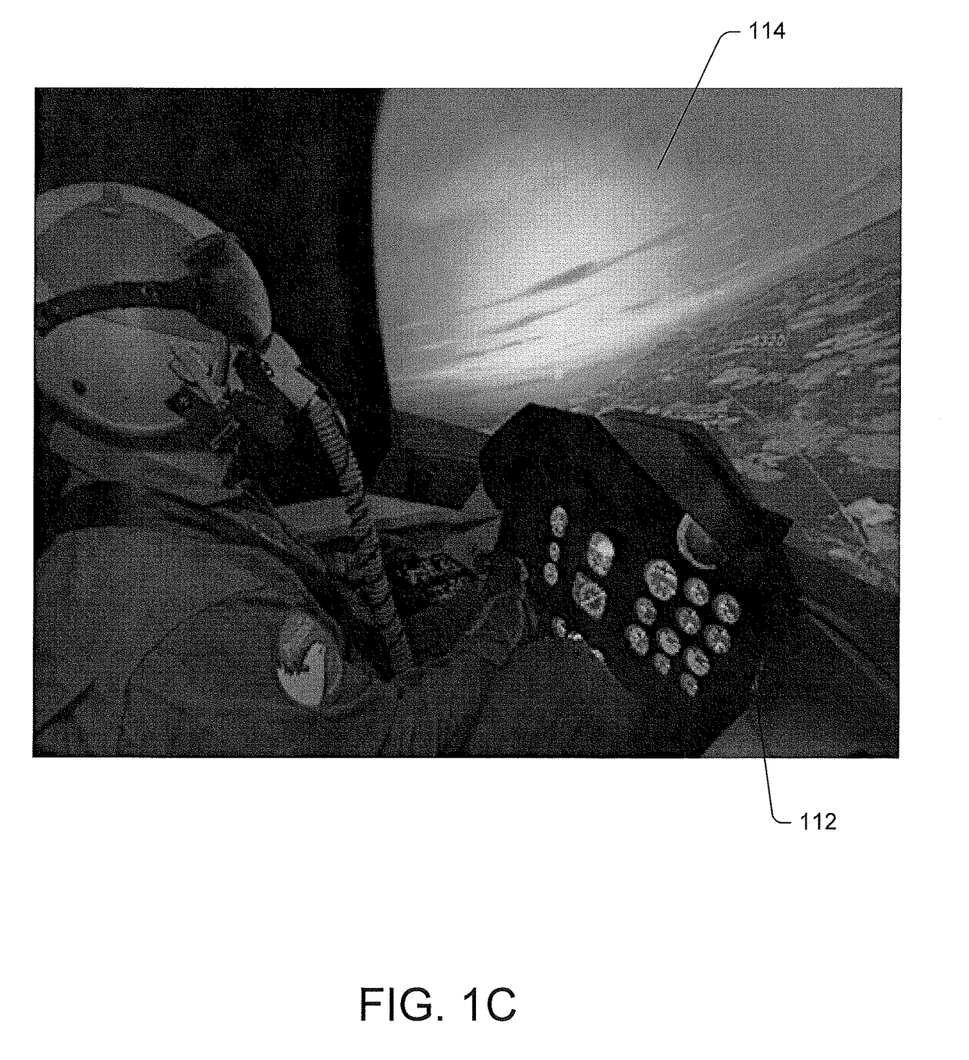
FIG. 1C shows a pilot in a cockpit of a virtual plane.

FIG. 1C shows an example view of a pilot inside of a cockpit unit 102. As illustrated in FIG. 1C, the inside of cockpit unit 102 may include a physical layout 112 replicating seating, and flight control/instrument layout of an actual cockpit of a predetermined aircraft. Additionally, when seated inside cockpit unit 102, interactive display 114 may fill a mock windows of a cockpit displaying virtual or superimposed video representing all aspects of a flight including takeoff, landing, and airborne flight visuals on a real-time basis. Thus, all aspects of a simulated aircraft flight environment can be replicated as a "virtual plane" in cockpit unit 102 including G-forces, and ±360 degrees of movement in yaw, pitch and roll axes.

Typically, when immersed inside cockpit unit 102, a trainee has no visual cues to the outside, and must rely fully on visual cues and instruments displayed in cockpit unit 102. Thus, a trainee can fly a virtual plane and physically experience in-flight conditions substantially matching an actual-predetermined aircraft simulated by simulator 102.

In the illustrative example, the simulator in FIG. 1A is the GL 4000™, and the simulator in FIG. 1B is the ATFS-400™, both of Environment Tectonics Corporation, USA. Although the example GL 4000™ and ATFS-400™ are shown herein for illustration, any of the systems, methodologies and principles described herein are not limited to any particular centrifuge-based simulator, and may be applied generally to other simulator brands and models.

Example Computer System (Controller)

Figure 2:
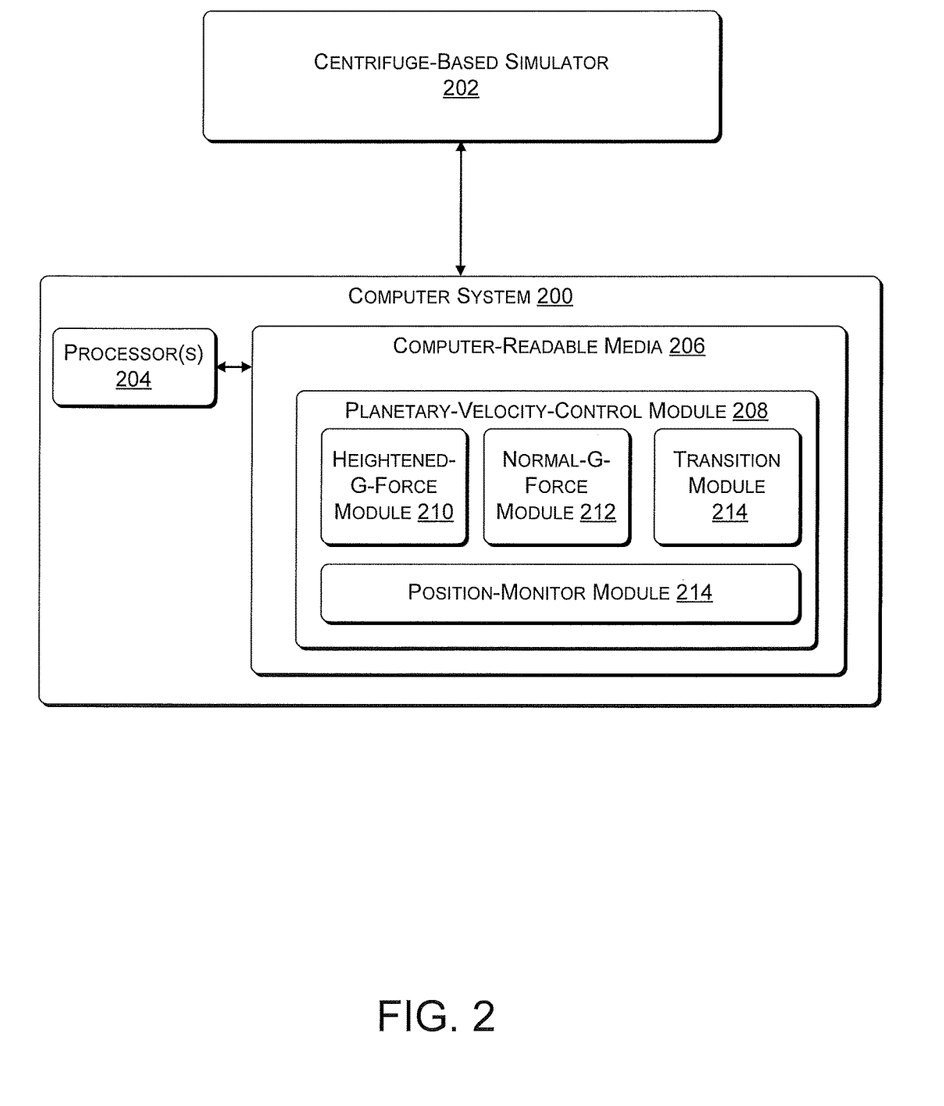
FIG. 2 is a block diagram illustrating a computer system used to control a centrifuge-based simulator.

FIG. 2 is a block diagram illustrating a computer system 200 used to control a centrifuge-based simulator 202 (such as simulator 100 shown in FIG. 1). Computer system 200 may be a component of simulator 202.

Computer system 200 may represent any suitable computing device(s) having one or more processor(s) 204 and the ability to access a computer-readable media 206. Processor(s) 204 interact with computer-readable media 206 to execute instructions that control physical movement of simulator 202, as well as to facilitate a virtual-flight environment that coincides with physical movements of simulator 202 that replicate a particular actual plane.

Processor(s) 204 may be distributed in more than one computer system and over a network (not shown). Examples of computer systems 200 may include, but are not limited to, a server, a personal computer, special computer, distributed-computer systems, or other computing devices having access to processor(s) and computer-readable media. Further, although not shown, any number of system busses, communication and peripheral interfaces, input/output devices, and other devices may be included in computer system 200, as is appreciated by those skilled in the art.

Computer-readable media 206 may include any suitable computer-storage media including volatile and non-volatile memory, and any combination thereof. For example, computer storage media includes volatile and non-volatile, removable and non-removable media implemented in any method or technology for storage of information such as computer readable instructions, data structures, program modules, or other data. Computer storage media may further include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory or non-transmission medium that can be used to store information for access by a computing device.

In other examples, the computer-readable media 206 may include communication media that may embody computer readable instructions, data structures, program modules, or other data in a modulated data signal, such as a carrier wave, or other transmission mechanism. As defined herein, computer-storage media does not include communication media.

Further, computer-readable media 206 may be local and/or offsite to computer system 200. For instance, one or more portions of, or all of data or code stored in computer-readable media 206, may be accessed from a computer-storage medium local to and/or remote to computer system 200, such as from a storage medium connected to a network.

Resident in computer-readable media 206 may be one or more operating systems (not shown), and any number of other program applications or modules in the form of computer-executable instructions and/or logic which are executed on processor(s) 204 to enable processing of data or other functionality.

Example—Planetary-Velocity Control Module

Computer system 200 is configured with a planetary-velocity-control module 208 maintained in computer-readable media 206. In one example, planetary-velocity-control module 208 may be implemented as code in the form of computer-readable instructions that execute on one or more processors 204. For purposes of illustration, programs and other executable-program modules are illustrated herein as discrete blocks, although it is recognized that such programs and components may reside at various times in different storage components. Further, such code may be implemented as one or more applications or modules, or may be integrated as components within a single application. Such code stored in computer-readable media 206 may be implemented across one or more servers in a cloud computing environment, on a local device, or on a combination of both. The following discussion does not limit the implementation of code stored in computer-readable media 206 to any particular device or environment.

Planetary-velocity-control module 208 may include components contained in computer-readable media 206. In one example, planetary-velocity-control module 208 includes: a heightened-G-force module 210, a normal-G-force module 212, and a transition module 214.

Example heightened-G-force module 210 facilities a mode of operation of simulator 202 in which planetary velocity exceeds a minimum threshold for imparting heighted G-forces on a trainee in cockpit unit 102 (such as shown in FIG. 1) while operating a virtual plane within simulator 202. Specifically, heightened-G-force module 210 instructs simulator 202 to rotate its cockpit unit around its center at a rate of rotation that physically imparts G-forces approximately greater than one (1) G-force on a trainee in cockpit unit 102 during operation of simulator 200.

Load factor is typically measured in multiples of force of gravity or "G's". For instance, if an airplane is generating twice as much lift as its weight it would then be experiencing a load factor of 2 or pulling 2 G's.

When in a heightened-G-force mode of operation, heightened-G-force module 210 may also cause simulator 200 to replicate a plurality of flight conditions in which a pilot may experience greater load factors. Such flight conditions may include taking off, landing, banking, encountering severe weather, encountering wake turbulence, experiencing a flight malfunction or some other condition possibly caused by the pilot, which if occurring in the real world, would cause approximately more than one G-force to be imparted on a pilot flying an actual plane.

When in a heightened-G-force mode of operation, simulator 200 may continue to move ±360 degrees of movement in yaw, pitch and roll axes, in addition to the planetary movement of cockpit unit 102.

When in a normal-G-force mode of operation, example normal-G-force module 212 instructs simulator 200 to replicate a plurality of conditions while ceasing rotation of the simulator altogether, or rotating the simulator at a rate of rotation that physically imparts, on the trainee during operation of the simulator, a G-force that is approximately one G-force.

For example, during a flight condition where there is straight-level flight, the load factor is approximately one G. Other approximately one G-force flight conditions may include wide turns, and various non-turning ascents or descents, and so forth. When in the normal mode of operation, normal-G-force module 212 instructs simulator 202 not to move its cockpit unit in a planetary fashion (i.e., to remain in a stationary position without circular motion). When in the normal mode of operation, normal-G-force module 212 may also instruct simulator to rotate its cockpit unit at a rate of rotation slow enough so approximately one G-force is imparted on a trainee.

In one example, configurable virtual-boundary areas may defined in terms of both location, and altitude, or may be dynamically generated as result of speed or movement of the virtual airplane. Other suitable transitions between heightened and normal G forces may be induced, automatically or manually, depending on the flight environment and condition attempting to be replicated.

When in a normal-G-force mode of operation, simulator 200 may continue to move ±360 degrees of movement in yaw, pitch and roll axes.

When in a transition mode of operation, example transition module 214 instructs simulator 200 to ramp-up or ramp-down its rate of rotation. Specifically, transition module 214 instructs flight simulator to transition between the heightened-G-force mode of operation and the normal-G-force mode of operation, or vice versa.

For example, suppose the flight condition of a virtual plane operated by a trainee in the simulator transitions from a take-off (i.e. a heightened G-force flight condition) to level flight (i.e. about one G-force). Then transition module 214 instructs simulator 202 to disengage activating planetary motion, thus causing the spinning cabin unit to decelerate its rate of rotation toward a zero, and reach a normal G force mode of operation.

In another example, suppose the flight condition of a virtual plane operated by a trainee in the simulator transitions from a level flight (i.e. about one G-force) to a landing (i.e. a heightened G-force flight condition). Then transition module 214 may instruct simulator 202 to initiate planetary motion, and permit the simulator to accelerate its rate of rotation from zero (or some other slow rate of rotation) to some rate, which will permit the simulator to quickly impart G-forces on the trainee.

In still another example, accelerating or decelerating the rotation of the flight simulator at a rate which is generally below a perceptible threshold for human detection. For instance, when the transition mode of operation is triggered, transition module 214 instructs simulator to rotate its cabin unit in planetary fashion at a sub-threshold (max 1-2°/sec$^2$)

rate during centrifuge operations that brings a trainee down to zero-planetary speed (see, i.e., Groen, J. J., Jongkees, L. B. W. "The threshold of angular acceleration perception," *J. Physiol* 107, 1-7 1948)(incorporated herein by reference)). Because the deceleration is below the threshold for human detection (i.e. "sub threshold"), the trainee/pilot is generally unaware that he or she is no longer rotating.

Since the trainee does not need G forces, he or she remains realistically immersed in the simulation (while in the normal G-force mode operation) without the accumulating effects of unnecessary planetary motion.

Subsequently, when G forces are desired during a profile, the reverse can be accomplished. This flexibility enables an unlimited number of transitions between heightened G-forces, and normal-G-force modes of operation. Additionally, the rate at which planetary motion is introduced or stopped is fully configurable. As appreciated by those skilled in the art, after having the benefit of this disclosure, optimum acceleration, deceleration, and transition rates to accomplish undetectable transition between modes of operation will vary in each simulator, and other factors, such as flight conditions.

So, a trainee operating a virtual plane within the simulator does not necessarily sense whether there is planetary movement of the simulator when transitioning between heightened and normal-G-force modes of operation. That is, by transitioning between heightened-G forces and normal G-forces in a gradual manner, trainees can acclimate and adapt to the sustained planetary-motion environment more comfortably and extend their time in the centrifuge-based simulators without becoming motion sick. When planetary motion is blended out (partial or no motion mode), sensory conflict between the semicircular canals and the visual system is eliminated and both the fast and slow rising components of motion sickness will begin to rapidly subside. During this period, trainees can also conduct normal operations and head movements without a coriolis-cross-coupled stimuli. When the staged event without planetary motion has ended, trainees can be unknowingly brought back into full motion via the blending (i.e., transitioning between modes of operation) process. This rate of transition in full motion is also accomplished subthreshold in order to maintain the desired immersion effects of the operation. That is, accelerating or decelerating the rotation of the flight simulator generally occurs at a velocity rate generally below a perceptible threshold for human detection, as described herein.

For example, the blending of heightened-G-force, normal-G-force and transition (i.e. partial) modes of operation may be performed at different phases of a flight. For instance, suppose a fighter pilot is conducting a simulator session in which both low and high G's are required for mission accomplishment. The initial part of the mission does not require heightened G forces so the pilot can operate in either the partial or non motion mode (i.e. takeoff to a target area). The second phase of the mission includes high-G forces so planetary-velocity-control module 208 activates planetary motion via the blending or transitioning between the different modes of operation described above. The third phase of this particular mission consists of an aerial refueling and subsequent landing at the launch airfield. Since heightened G's are not required for those events, the pilot is blended out of full planetary mode and into the partial or no motion mode as needed.

Figure 3:
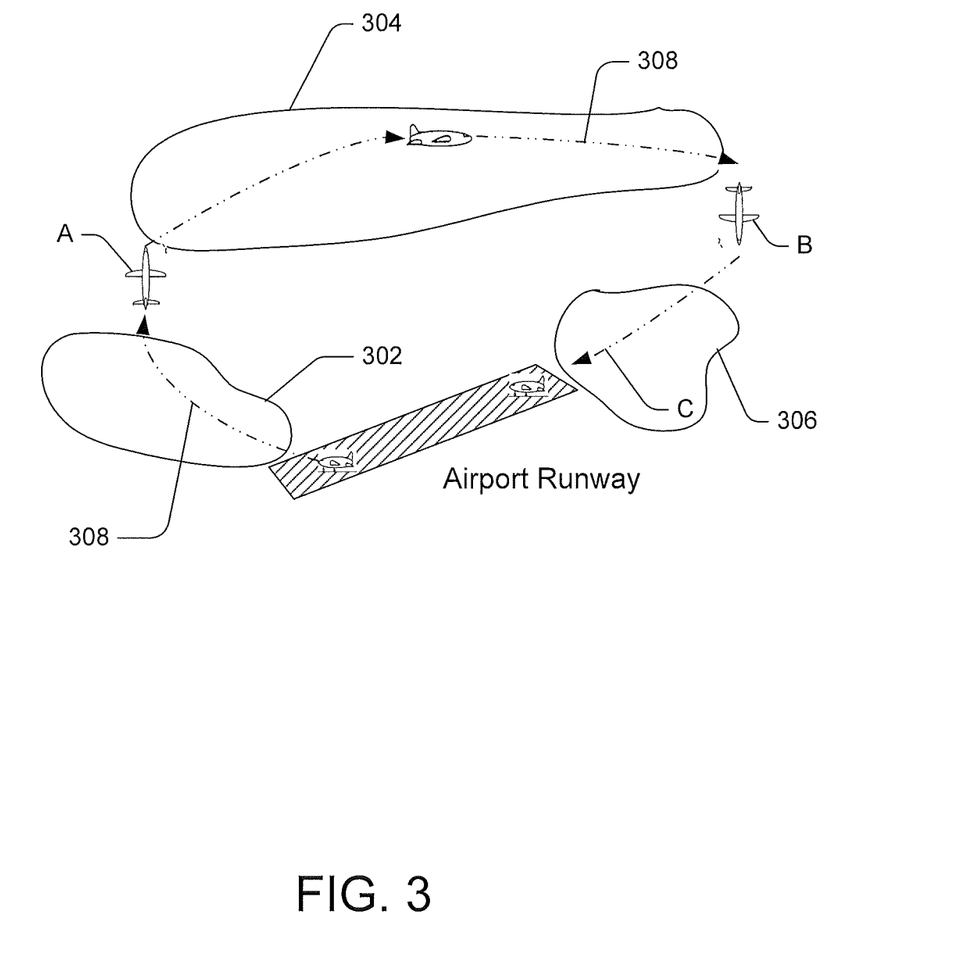
FIG. 3 shows example configurable-virtual boundary areas.

In another example, transitioning between the heightened-G-force mode of operation and the normal-G-force mode of operation, or vice versa, may be triggered by monitoring (i.e. tracking) the position of a virtual plane relative to a virtual boundary. Specifically, a position-monitor module 214 monitors a position of a virtual plane relative to a predetermined virtual boundary, and triggers (i.e., instructs the transition module 212) to either accelerate and decelerate rotation of the simulator based, at least in part, on the position of the virtual plane relative to the virtual boundary. A plurality of configurable virtual-boundary areas may be pre-defined before virtual-flight simulation. FIG. 3 shows exemplary configurable-virtual boundary areas 302, 304, and 306, shown in virtual three-dimensional space (FIG. 3 is not drawn to scale).

Referring to the example of FIG. 3, a first virtual-boundary area 302 may be defined to include the take-off portion of a runaway, and extend to a few thousand feet in the air in which heightened G-forces may be experienced by a trainee when flying a virtual plane that is taking off and climbing in a centrifuge-based simulator. That is, when a virtual plane is taking off and climbing within virtual-boundary area 302, simulator 200 (FIG. 2) imparts a heightened-G-force on the trainee in cabin unit 102 (FIGS. 1A and 1B). These heightened-G-forces are intended to substantially match actual G forces a pilot may experience when flying a predetermined aircraft according to the same temporal and behavior position of a the virtual plane following flight trajectory 308.

As the virtual plane exits virtual-boundary 302 at around position A, a transition mode of operation is triggered, and transition module 214 may instruct simulator 202 to decelerate planetary rotation of simulator 202 toward zero velocity in anticipation of entering virtual-boundary area 304 in which there is level flight. During this portion of flight trajectory 308, no G-forces are required so the trainee can operate in normal-G mode of operation as described above.

At around a position B virtual plane prior to entering enter virtual-boundary 306, in which the flight condition of a virtual plane transitions from a level flight (i.e. about one G-force) to a landing (i.e. a heightened G-force flight condition). Here, transition module 214 may instruct simulator 202 to initiate planetary motion, and permit the simulator to accelerate its rate of rotation from zero velocity (or some other slow rate of rotation) to some planetary velocity, which will permit the simulator to quickly impart G-forces on the trainee at or around position C (such as just prior to a plane landing on a carrier or a runway in which heightened G-forces may be experienced).

Transition between normal G and heightened-G-force events, or vice versa, by accelerating or decelerating the rotation of the flight simulator is generally performed at a rate which is generally below a perceptible threshold for human detection; provided there is a large enough gap between the occurrence of each heightened G-force or non-G force event.

As appreciated by those skilled in the art, partial or slight perception of the acceleration or deceleration of a cockpit unit 102 (FIGS. 1A and 1B), may be detected by certain individuals who are more sensitive to motion ques. Additionally, rates of rotation may slightly exceed acceptable thresholds of acceleration or deceleration as defined above. Such rates of rotation—although on the cusp of, partially exceeding, or slightly exceeding the threshold of human perception—may also be considered within the realm of being generally below the perceptible threshold of human detection in some situations.

As appreciated by those skilled in the art having the benefit of the disclosure, the foregoing example with reference to FIG. 3 is only one of many different ways in which different modes of operation, and a plurality of configurable flight conditions may be implemented/triggered with corresponding G-forces; all of which are intended to match actual G forces occurring in a predetermined aircraft during the same flight conditions.

The blending of heightened-G forces with non-heightened G-forces, and transitioning there between, is systematically employed by system 200 (FIG. 2) to minimize sustained G-planetary-motion exposure time to those events which specifically benefit and require continuous G forces.

Example—Illustrative Process

Figure 4:
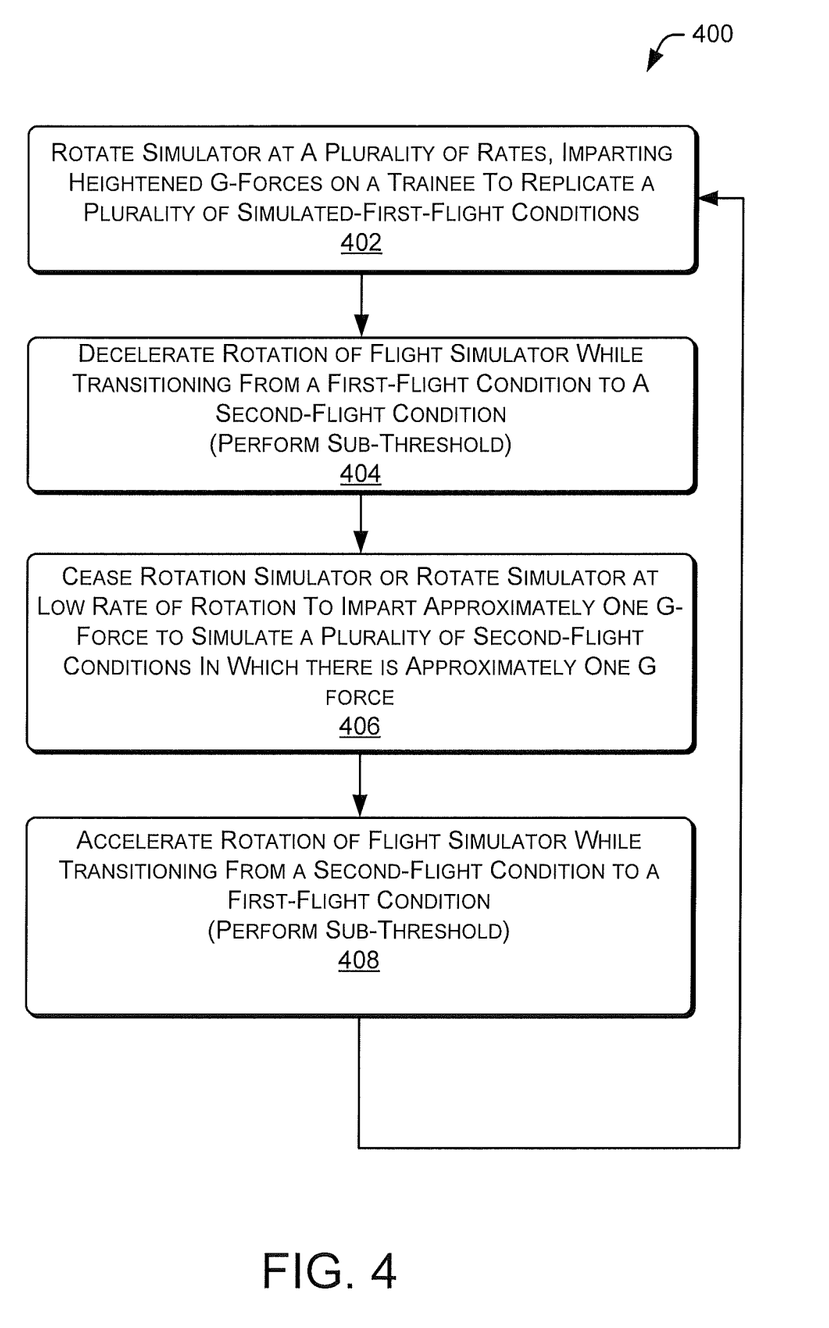
FIG. 4 shows an illustrative process for controlling a centrifuge-based simulator, according to various embodiments.

FIG. 4 shows an illustrative process 400 for controlling a centrifuge-based simulator, according to various embodiments. Process 400 may be described with reference to FIGS. 1A, 1B and 1C, 2 and 3.

Process 400 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Also, one or more of the described blocks may be omitted without departing from the scope of the present disclosure.

At 402, a simulator simulates a plurality of first-flight conditions by rotating the simulator at rate of rotation of that physically imparts heightened G-forces (i.e., approximately more than one G-Force). And, after simulating at least one of the plurality of first-flight conditions, process 400 proceeds to 404.

At 404, assuming simulator is next going to simulate one of a plurality of second-flight conditions, the planetary velocity of the simulator is decreased over a period of time approaching zero velocity. At least a portion of the deceleration of the rotation of the simulator is performed at velocity rate, which is generally below a perceptible threshold for human detection by the trainee while operating the simulator.

At 406, a simulator simulates a plurality of second-flight conditions by ceasing rotation of the simulator or ceasing rotating the simulator at a low rate of rotation, so that approximately one G-force is physically imparted on the trainee during operation of the simulator. And, after simulating at least one of the plurality of second-flight conditions, process 400 proceeds to 408.

At 408, assuming simulator is next going to simulate one of a plurality of first-flight conditions, the planetary velocity of the simulator is accelerated. At least a portion of the acceleration of the rotation of the simulator (i.e. ramping up) is performed at velocity rate, which is generally below a perceptible threshold for human detection by the trainee while operating the simulator (movement of the simulator is generally performed at sub-threshold levels of human detection).

CONCLUSION

Simulation in centrifuge-based simulators addresses all elements of fidelity: realistic cockpits or modules, high resolution wide field of view "out-the-window" (OTW) visual displays, representative aeromodels, motion cueing, and mission taskings to stress the trainee in a manner similar to what he or she would experience if operating a real-aerospace vehicle. These fidelity aspects assist in immersing trainees to maximize the simulation experience. The key difference in centrifuge simulations, as opposed to other motion platforms, including six DoF platforms, is the ability to sustain G forces. However, this capability can create sensory conflicts, cause fatigue, or other negative motion artifacts.

To counter some of the negative effects of centrifugation, the aforementioned disclosure introduces centrifuge-based simulators which have three motion states of operation available. These modes are heightened-G-force motion, transition motion (typically a transitioning mode of operation), and no heightened-G-force modes. All modes of operation permit full three degrees of freedom (pitch, roll, and yaw). Transition mode of operation simply either eliminates or introduces the planetary motion of the device, and sometimes at a sub-threshold perceptible level. The ability to blend between these modes of operation without trainee knowledge introduces a capability to complete full immersion flight simulation while minimizing or eliminating the negative effects of planetary-rotation motion.

Thus, in some examples, a heightened G mode of operation is the operation phase where the G forces generated by the simulated flight is replicated to the extent possible by simply accelerating the arm to generate a centrifugal force and orienting the pilot to distribute this centrifugal force into its proper x, y and z components on the subject in the cockpit unit, to replicate forces and sensations that would be experienced by a pilot in the cockpit of a real aircraft.

Additionally, a normal G mode of operation is the operation phase where motion cues are emphasized instead of sustained G forces. This is accomplished by slowing the arm down to a level where it is not sensed by the trainee or by stopping it and then, commanding appropriate pitch, roll and yaw positions as appropriate to the cockpit unit which correspond to the rotational accelerations of the aircraft. These commands dissipate over time to keep the cockpit unit neutral.

Reference herein to "about" or "approximately" with respect to the term 1G means a G-force generally experienced by a person resting on the Earth's surface, but may be slightly more or less than 1G, depending on location and/or slight movement of the arm of a centrifuge-based simulator.

Reference herein to "example," "embodiments" or similar formulations means that a particular feature, structure, operation or characteristic described in connection with the example, is included in at least one implementation in this description. Thus, the appearance of such phrases or formulations herein are not necessarily all referring to the same example. Further, various particular features, structures, operations, or characteristics may be combined in any suitable manner in or more examples.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method for controlling a centrifuge-based-flight simulator, comprising:
    generating a virtual scene in a cockpit unit of a virtual plane representing an actual-predetermined aircraft replicated by the simulator, wherein the cockpit unit is located at a distal end of an arm of the simulator;
    rotating the simulator at a plurality of rates of rotation that physically imparts, on a trainee while operating the virtual plane during operation of the simulator, a G-force that is greater than about one (1) G, to replicate a plurality of first-flight conditions which causes the trainee to experience heightened G-forces within the simulator, wherein the G-forces substantially match actual G-forces, which would occur in the predetermined aircraft during the same flight conditions as the simulated first-flight conditions, and wherein the first-flight conditions includes at least one of: taking off, landing, banking, encountering severe weather, and encountering wake turbulence in the virtual plane;

ceasing the rotation of the simulator thereby physically imparting on the trainee during operation of the simulator, a G-force of about one (1) G, to simulate a plurality of second-flight conditions which cause the trainee, while operating the virtual plane within the simulator, to experience no heightened G-forces, wherein the about one (1) G force substantially matches the actual G-force which would occur in the predetermined aircraft during the same flight conditions as the simulated first-flight conditions, and wherein the second-flight conditions includes at least one of: straight-level flight, wide turns, non-turning ascents, and non-turning descents;

decelerating the rotation of the flight simulator at a rate below a generally perceptible threshold for human detection by the trainee while operating a virtual plane within the simulator to transition to from one or more of the plurality of first-flight conditions to one or more of the plurality of second-flight conditions;

accelerating rotation of the flight simulator at a rate below a generally perceptible threshold for human detection to transition to from one or more of the plurality of second-flight conditions to one or more of the plurality of first-flight conditions;

monitoring a position of the virtual plane relative to a predetermined virtual boundary; and performing at least one of accelerating rotation of the arm of the simulator, decelerating rotation of the arm of the simulator, and maintaining the arm of the simulator in a stationary position, based at least in part, on the position of the virtual plane relative to the virtual boundary, and whether the virtual plane is experiencing the first or second-flight conditions.

2. A system for operating a centrifuge-based-flight simulator, comprising:

one or more processors, and computer-readable media communicatively coupled to the one or more processors collectively forming a controller, the controller operable in one of:

a heightened G-force mode in which the controller instructs the simulator to replicate a plurality of first-flight conditions by rotating the simulator at a plurality of rates of rotation that physically imparts, on a trainee during operation of the simulator, a G-force that is greater than about one (1) G;

a normal G-force mode in which the controller instructs the simulator to replicate a plurality of second-flight conditions by ceasing the rotation of the simulator thereby physically imparting on the trainee during operation of the simulator, a G-force of about one (1) G;

wherein the controller is further operable in a ramp-down mode in which the controller instructs the simulator to transition from one or more of the plurality of first-flight conditions to one or more of the plurality of second-flight conditions by decelerating the rotation of the flight simulator at a rate below a generally perceptible threshold for human detection by the trainee while operating a virtual plane within the simulator, wherein the G-forces substantially match actual G-forces, which would occur in a predetermined aircraft during the same flight conditions during the simulated first-flight conditions and simulated second-flight conditions, wherein the first-flight conditions includes at least one of: taking off, landing, banking, encountering severe weather, and encountering wake turbulence in the virtual plane, wherein the second-flight conditions includes at least one of: straight-level flight, wide turns, non-turning ascents, and non-turning descents;

wherein the controller is further operable to:

generate a virtual scene in a cockpit of a virtual plane representing an actual-predetermined aircraft replicated by the simulator;

monitor a position of the virtual plane relative to a predetermined virtual boundary;

transition between the heightened and normal G-force modes based at least in part, on the position of the virtual plane relative to the virtual boundary; and wherein the controller is further operable to maintain the arm of the simulator in a stationary position based during the second-flight conditions.

3. The system of claim 2, wherein the controller is further operable to instruct the simulator to move to replicate movement of a physical plane when performing at least one of a pitch, roll, and yaw.

* * * * *